RELAY TRANSLATING CIRCUIT

Filed June 28, 1950 2 SHEETS—SHEET 1

INVENTOR
T. L. DIMOND
BY I. MacDonald
ATTORNEY

Dec. 25, 1951 T. L. DIMOND 2,580,082

RELAY TRANSLATING CIRCUIT

Filed June 28, 1950 2 SHEETS—SHEET 2

INVENTOR
T. L. DIMOND
BY I. MacDonald
ATTORNEY

Patented Dec. 25, 1951 2,580,082

UNITED STATES PATENT OFFICE 2,580,082

RELAY TRANSLATING CIRCUIT

Thomas L. Dimond, Rutherford, N. J., assignor to Bell Telephone Laboratories, Incorporated, New York, N. Y., a corporation of New York Application June 28, 1950, Serial No. 170,923

4 Claims. (Cl. 179—18)

Figure 1:
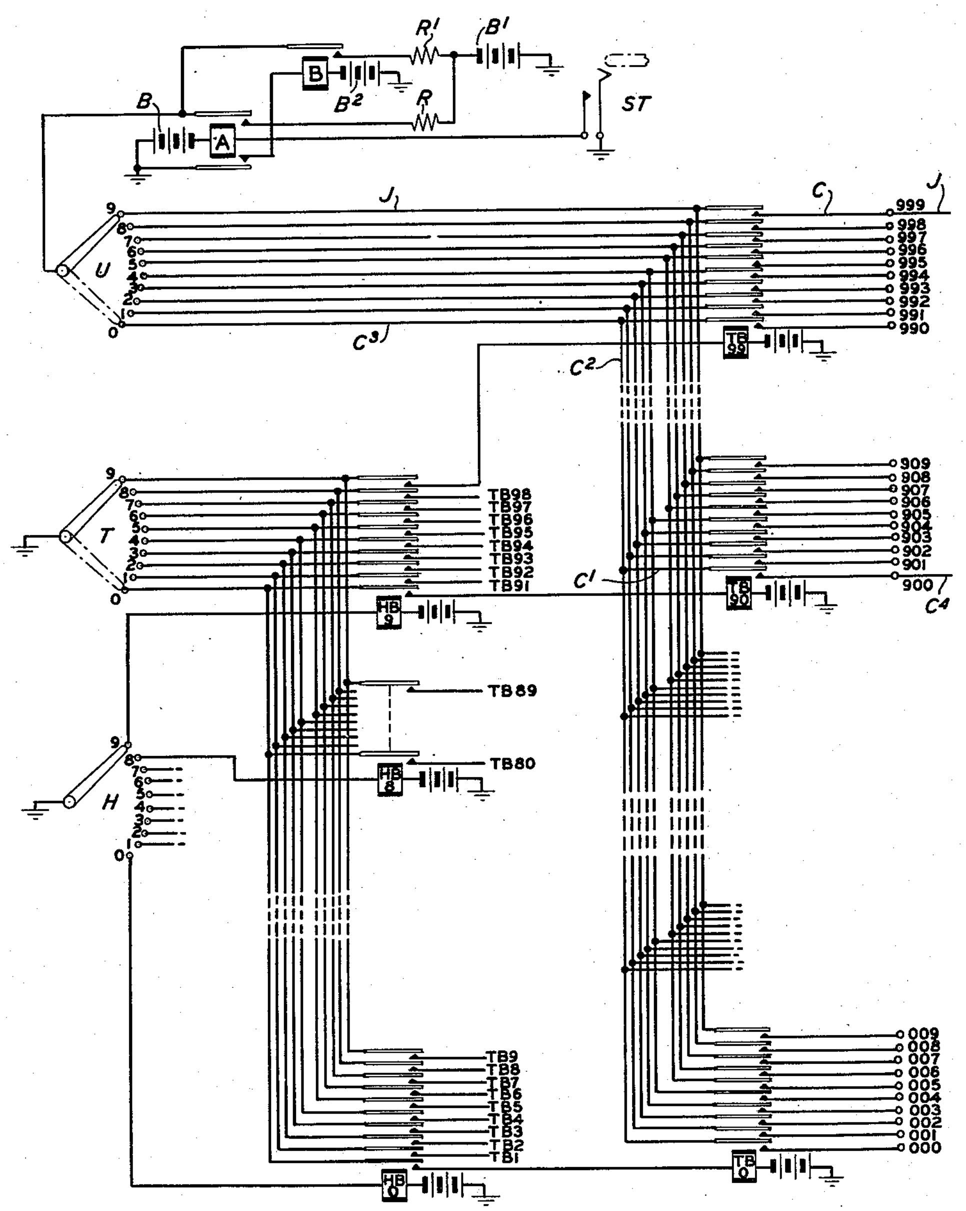

This invention relates to automatic telephone switching systems of the type often referred to as common control systems, and particularly to means in such systems by which the telephone directory number of a called subscriber may, in effect, be translated into terms that will enable the marker circuit of such system to determine the location of the hold magnet of the called line in that system so that the connection of the calling line to the called line may be readily effected.

In cross-bar systems, the location of any subscriber's line on the switching frame has been rendered independent of the directory number by a translating circuit commonly called a "number group circuit" which is provided for translating the directory number of a subscriber's line into the indicia representing the location of the line on the switching frames.

In a common control telephone switching system, particularly of the cross-bar type, each subscriber's line has associated with itself a line relay and the hold magnet of a cross-bar switch, which equipment is located on frames in the central office. The line equipment is usually considered as including the line hold magnet. The location of a particular hold magnet and thus the location of the line may be defined by specifying the number of the line-link frame and the numbers of the vertical group and the horizontal group of switches and also the vertical file of hold magnets upon the frame in which the particular hold magnet appears.

In my previous application, Serial No. 160,497, filed May 6, 1950, I show and describe an improvement in the number group circuit (translating circuit) of a cross-bar telephone system which translates the telephone directory number of the called subscriber's line to an indication of the location of the hold magnet of that line upon a line-link frame of such system, the improvement consisting in the use of a "ring" type of translator and switching means by which the translator is made effective. In that type of translator there is a conductor or jumper for each directory number associated with the number group. There is also a group of relays whose function is to select any one of the jumpers in accordance with the directory number and to send a surge of current through it. There is also a plurality of groups of coils, each coil having associated with it a device, such as a gas-filled tube, to convert a low power current into a current suitable for operating a relay. Each coil consists of a closed magnetic core with an output winding thereon, the said winding being connected to one of the gas-filled tubes in such a manner that when a voltage of sufficient magnitude is generated in the winding the tube will be fired. The input windings of the coils consists of the jumpers mentioned above which are threaded through the closed cores. Each jumper is threaded through a combination of coils, which combination is identified with the location of the line equipment on the frames. The jumper wire acts as a primary winding for each coil through which it is threaded. When the surge of current occurs in a jumper, the output windings of the coils through which the jumper is threaded are energized and the corresponding tubes will be fired. The tubes in turn cause relays in the marker to operate, and the combination of relays thus operated indicates the location of line equipment on the frame.

The main advantage of the "ring" translator is that only a single jumper needs to be changed when the relation between a directory number of a line or station and the line equipment changes. This reduces considerably the amount of work required in making the changes necessitated by the changing traffic conditions.

The present invention is an improvement over the invention forming the subject of my hereinbefore identified application in that I have performed the same result with much less equipment. The equipment I have dispensed with are the gas-filled tubes which are used to convert the low power current into a current suitable for operating the relays which are located in the marker, as disclosed in detail in my said application. These relays operate in combinations, dependent on how the jumper wires which carry the current to excite the translator rings, are threaded through them.

In addition to dispensing with the gas-filled tubes entirely, I also dispense with the ring-type closed transformers by substituting relays therefor, each relay having an armature and front contact. Any jumper which is threaded through the area enclosed by the cores will serve as a single turn winding for each relay and will energize a combination of relays to attract their armatures to close circuits for a combination of register relays corresponding to the combination of translating relays through which the jumper is threaded, which register relays in turn close circuits to operate the hold magnet of the called line, as described in detail in my said application.

Thus in the improved circuit arrangement of this invention the former ring-type translators are replaced by a new type of relay which not only dispenses with the gas-filled tubes which are fired to produce sufficient current to energize the register relays which select and operate the hold magnet of the desired line, but such register relays are operated directly from the contacts of this new type of relay.

Figure 2:
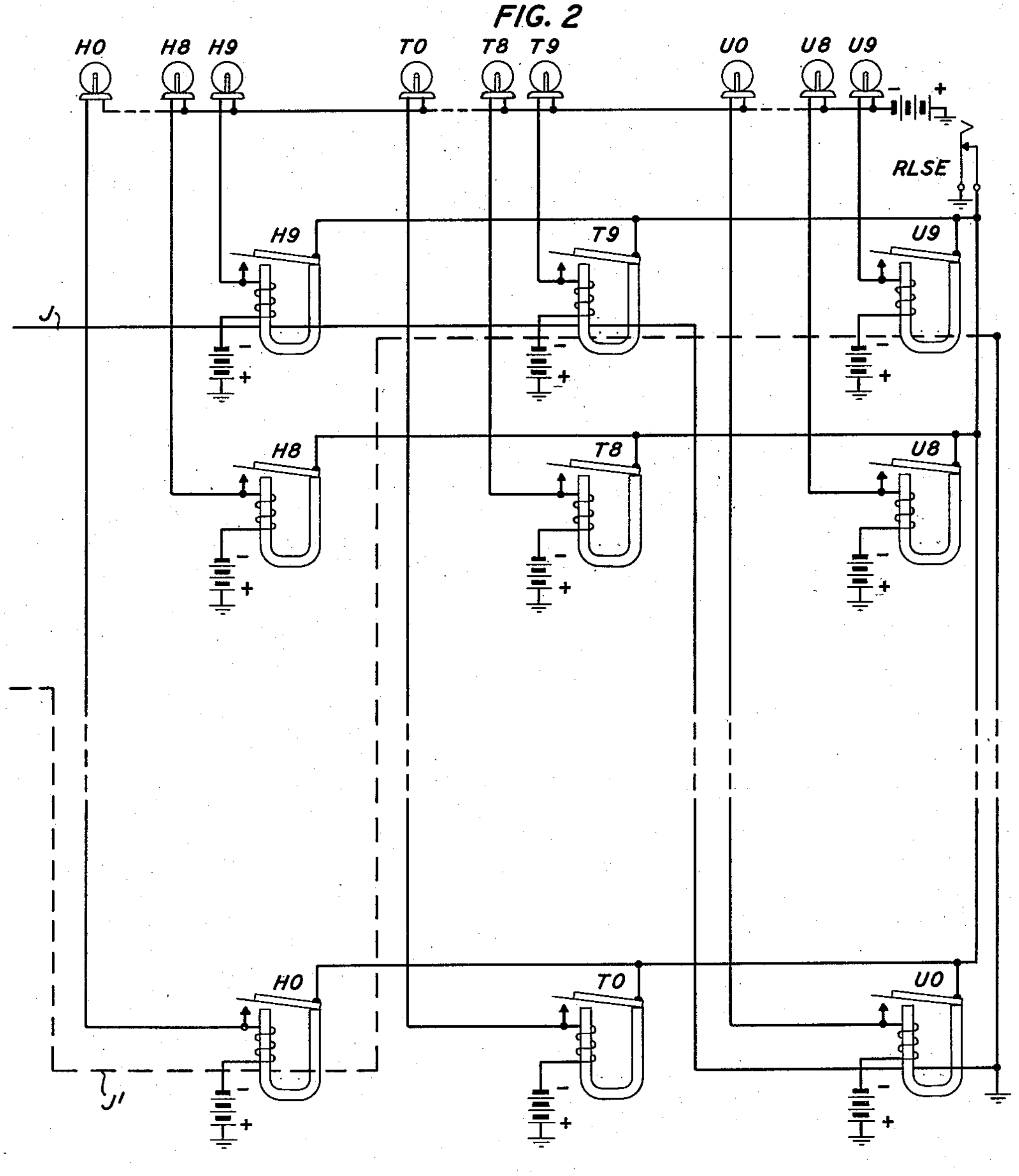

Referring to the drawings:

Figs. 1 and 2 when taken together show a diagrammatic representation of the system.

Referring to Figs. 1 and 2, as has been stated, the translator rings and firing tubes of my patent application above identified are replaced by relays $H^9$, $T^9$, $U^9$, $H^8$, $T^8$, $U^8$, etc., Fig. 2. These relays are U-shaped and each one has an armature and front contact. Jumper wires as described in my said application are provided one for each directory number. Only two are shown, numbered J and J'. Each jumper wire is threaded through a combination of relays, which combination in my said application is identified with the location of the equipment of the called number. In the embodiment of the present invention, the corresponding equipment consists of signal lamps. When a surge of current is impressed upon a jumper wire the windings of the relays through which the jumper wire is threaded are energized and cause the relays to attract their armatures which close circuits to such signal lamps which indicate the translated called number. The relays in operating close locking circuits which maintain the relays locked up until the time for their release.

The circuit arrangement shown in Figs. 1 and 2 will now be described in detail. This circuit arrangement provides a translator for translating from one three-digit number to another. The input number, which it is desired to translate to another number, is set up on three manually operable rotary switches, one, H for the hundreds digit, one, T for the tens digit and one, U for the units digit. The hundreds digit is set up on the H switch, the tens digit on the T switch and the units digit on the U switch.

It will be assumed that the three-digit number, 999, is to be translated to 990 to achieve the desired result. The three wipers on the rotary switches U, T, H, are rotated manually to and set on the terminals 9 as indicated in full lines in the drawing, Fig. 1.

The circuit arrangement disclosed in the present embodiment of the invention takes care of 1000 called numbers, but of course it could be expanded to 10,000 or more without difficulty. Therefore, switches H, T and U will have ten terminals each. Switch H has ten relays connected directly to its ten terminals. HB0, HB8 and HB9 only are shown. The last digits of the reference characters mean the zero, the eight and the ninth hundred blocks of relays in the thousand. The ten relays of the tens block relays TB are adapted to be connected to their respective terminals 0 to 9 on the tens switch T through armatures and front contacts of the hundreds block relays HB. Two of these tens block relays are shown, i. e., the 0 and the ninth tens relays. The terminals of the units switch do not have relays associated with them, since when a tens block relay is energized, its armatures connect all the line terminals of that group to the unit switch terminals, and the setting of the units wiper determines the line selected in the selected ten line numbers.

It should be borne in mind that the diagrammatic showing in Figs. 1 and 2 takes care of three-digit numbers only. In other words, it will only translate any specific three-digit number to some other predetermined three-digit number in that thousand. Of course, as stated, the circuit arrangement could be readily expanded.

Now, since the number 999 is to be translated to number 990, the wiper H of the hundreds switch is set on terminal 9 of the hundreds bank. Also since we are translating 999 to 990, the tens wiper T is set on terminal 9 of the tens bank. That means the group of ten terminals 990 to 999 are selected since the desired number 999 is in that tens group. Since the units digit is 9 the units wiper is set on the terminal 9 of the units bank.

Due to the location of the hundreds, tens and units wipers as described, i. e., all set on their No. 9 terminals, the following relays are operated to prepare a circuit to energize relays H9, T9 and U0 to light lamps H9, T9 and U0 which will represent No. 999 translated to the desired number 990.

The closure of the circuit for these relays is brought about as follows. When the start key ST, Fig. 1 is actuated, it closes a circuit for relay A from battery B. Relay A at its upper armature and front contact connects a battery of relatively high amperage B' through resistance R to wiper U and thence by way of units terminal 9 to jumper wire J of the desired or called number. Relay A at its lower armature and front contact closes a circuit for relay B from battery B2. Relay B in operating in turn closes a booster circuit from battery B' through a resistance R' and wiper U to jumper wire J.

The relays A and B operate and release in tandem, so that neither one of them makes or breaks all the current in the jumper wire.

The two paths from battery B' just described connected to jumper wire J of the called line, lead from units wiper U, uppermost armature and front contact of tens block relay TB99 to terminal 999 which is the number to be translated to 990. The uppermost armature of tens block relay TB is closed at its front contact due to the hundreds wiper H9 having been set on its terminal 9 resulting in the hundreds block relay HB9, becoming energized. Due to the energization of the hundreds block relay HB9 all of its armatures are attracted to close their contacts, and since the tens wiper T of the tens switch is set on terminal 9, the tens block relay TB99 is energized and all of its armatures are attracted. Thus its top armature and front contact connect the conductor C to the jumper wire J of line 999 which leads through the magnetic cores of relays H9, T9 and U0 (Fig. 2) to ground.

These relays H9, T9 and U0 are energized by the fields created in their cores by the current from battery B' (Fig. 1) and attract their armatures, closing circuits to light lamps H9, T9, U0. Hence number 999 is translated to No. 990.

These relays operate satisfactorily when a current of 10 to 15 amperes is passed through the jumper wire.

The relays, upon becoming energized, in addition to lighting the respective lamps, close locking circuits for themselves to ground at the release key RLSE, having a normally closed contact. When it is desired to extinguish the lamps this key is opened.

While the showing in the schematic representation, Figs. 1 and 2 and the description just completed of translating No. 999 to No. 990, may suffice for a comprehension of this invention, a detailed description will now be given of the translation of another three-digit number into a different three-digit number, i. e., a translation of No. 900 to No. 099.

In this case it will only be necessary to start tracing the circuit from wiper U of the units switch after stating that the position of wipers T and U of the tens and unit switches have been transferred to the zero positions as shown in dotted line in Fig. 1. The hundreds wiper will, of course, remain on the terminal 9 since 900 is in the same hundred as the former number. Thus the circuit for hundreds block relay HB9 will be closed as when the No. 999 was translated to No. 990 as previously described in detail. However, in order to translate No. 900 to No. 099, the tens wiper T is shifted to the zero terminal of the tens switch as shown in dotted lines in Fig. 1 which closes a circuit to operate the tens block relay TB90 which attracts all of its armatures to their front contacts. The circuit for relay TB90 leads through the lowermost armature and front contact of hundreds block relay HB9 which relay is energized due to the wiper of the hundreds switch being set on the No. 9 contact of that switch. The number to be translated being No. 900, the U wiper is shifted to the zero terminal as shown in dotted lines.

We can now trace the circuit which translates No. 900 to No. 099 beginning with wiper U. It is as follows: wiper U, terminal zero, conductor $C^3$, $C^2$, C′, lowermost armature of the tens block relay TB90, front contact thereof, to number terminal 900, conductor $C^4$, jumper wire J′, in dotted line, which passes through the cores of relays H0, T9 and U9 to ground. These relays in operating close circuits for lamps H0, H9 and U9. Hence No. 900 is translated to No. 099.

The start key ST (Fig. 1) is only held closed until the connection is set up, whereupon the operator releases it.

The hundreds, tens and units wipers, while shown as manually operated, could be operated automatically under control of certain apparatus which is controlled by dial pulses sent in by the subscriber as shown and described in my said application.

What is claimed is:

1. In combination, a plurality of electromagnetic relay structures, contacts controlled by the magnetic energization of said structures, a plurality of jumper wires threaded through different combinations of said relay structures, apparatus for selecting one of said jumper wires, apparatus for applying an electrical condition to the selected jumper wire for operating the relays through which the jumper wire extends, locking circuits for said relays closed upon the energization thereof, and other circuits also closed upon the energization of said relays and including devices to indicate the operated relays.

2. In combination, a plurality of electromagnetic relay structures having cores each provided with a gap contact controlled by the armatures of said relays, a plurality of jumper wires threaded through different combinations of said relay cores, apparatus for selecting one of said jumper wires, apparatus for applying potential to the selected jumper wire for operating the relays through which the jumper wire extends, locking circuits for said relays closed by the armatures thereof upon the energization of said relays, and other circuits also closed by the armatures of said relays upon the energization thereof including devices to indicate the operated relays.

3. In a telephone switching system, in combination, a plurality of relays each having a movable armature, a magnetic core structure and a coil thereon, a plurality of jumper wires inductively linked with one of a plurality of combinations of said relay core structures, the said combinations being discrete, apparatus for selecting in accordance with a directory number one of said jumper wires, means responsive to said selecting apparatus for applying an electrical condition to said selected jumper wire to induce voltages in the coils individual to the relay core structures with which said conductor is inductively linked, whereupon said combination of relays individual to said jumper wire attract their armatures, locking circuits closed by the attraction of said relay armatures and including said coils and devices energized by the attraction of the armatures of said relays to indicate the translated number.

4. In a telephone switching system, in combination, relays having a movable armature, a magnetic core structure, and a coil thereon, a plurality of jumper wires inductively linked with one of a plurality of combinations of said relay core structures, apparatus for selecting one of said jumper wires in accordance with a directory number, means responsive to said apparatus for applying an electric condition to said jumper wire to induce a voltage in each of the coils upon said relay core structures with which said jumper wire is inductively linked, whereupon said combination of relays individual to said jumper wire attract their armatures, locking circuits closed by the attraction of said relay armatures, and devices energized by the attraction of the armatures of said relays to indicate the translated number.

THOMAS L. DIMOND.

REFERENCES CITED

The following references are of record in the file of this patent:

UNITED STATES PATENTS

| Number | Name | Date |
|---|---|---|
| 2,510,061 | Branson et al. | June 6, 1950 |